United States Patent [19]
Neri

[11] Patent Number: 5,558,251
[45] Date of Patent: Sep. 24, 1996

[54] APPARATUS FOR METERING PIGMENTS FOR PAINTS AND THE LIKE

[76] Inventor: Giuseppe Neri, Via dei Lavoratori, 128/130, 20092 - Cinisello Balsamo (Milano), Italy

[21] Appl. No.: 324,743

[22] Filed: Oct. 18, 1994

[51] Int. Cl.6 ............................................. B67D 5/52
[52] U.S. Cl. .................. 222/135; 222/144; 222/149; 222/168; 222/387; 222/509
[58] Field of Search .................................. 222/135, 144, 222/144.5, 148, 149, 150, 168, 380, 386, 387, 509

[56] References Cited

U.S. PATENT DOCUMENTS

| | | | |
|---|---|---|---|
| 2,525,331 | 10/1950 | Adams | 222/150 |
| 3,850,345 | 11/1974 | Merritt | 222/380 X |
| 4,341,329 | 7/1982 | Kuemmerer | 222/380 X |
| 4,767,031 | 8/1988 | Pröepper | 222/380 |
| 4,967,938 | 11/1990 | Hellenberg | 222/144 |
| 5,119,973 | 6/1992 | Miller et al. | 222/135 X |
| 5,356,041 | 10/1994 | Hellenberg et al. | 222/144 X |
| 5,400,927 | 3/1995 | Marchadour | 222/380 |

*Primary Examiner*—Joseph Kaufman
*Attorney, Agent, or Firm*—Bucknam and Archer

[57] ABSTRACT

An apparatus for metering pigments for paints and the like is provided with a bearing framework on which is disposed a rotary carousel supporting a plurality of pigment vessels, each of which is provided with a delivery or metering assembly. The main feature of the invention is that the delivery assembly has a valve including a closure stem which can be located at a closing position, an opening position and a draining position in which the stem partially projects from the delivery nozzle.

1 Claim, 5 Drawing Sheets

APPARATUS FOR METERING PIGMENTS FOR PAINTS AND THE LIKE

BACKGROUND OF THE INVENTION

The present invention relates to an apparatus for metering pigments for paints and the like.

There are already known apparatus for metering pigments for paints and the like, which pigments are introduced into the paint materials, pre-set with base colors, so as to provide desired color paints.

These prior apparatus usually comprise a plurality of vessels from which metered amounts of pigments can be delivered, said vessels being provided, at metering outlets thereof, with three-way rotary valves or with blade valves.

Such an approach is affected by several drawbacks since pigment deposits are frequently left at the delivery nozzle.

This drawback, in particular, is due to the fact that, as a pigment delivery is shut-off, the metering operation can not be performed with the required accuracy; moreover, the formed deposits can prevent subsequent metering operations from being properly performed.

All the prior apparatus, actually, are affected by the above mentioned drawbacks since they do not allow for precise metering of the pigment amount being introduced into the paint.

SUMMARY OF THE INVENTION

Accordingly, the aim of the present invention is to overcome the above mentioned drawbacks, by providing an apparatus for metering pigments for paints and the like, which comprises a new type of valve allowing to perfectly drain or clean the nozzle used for metering the pigment, while allowing a very accurate metering of the pigment without generating pigment deposits and the like.

Within the scope of the above mentioned aim, a main object is to provide such an apparatus which allows to perform a very accurate metering of the pigments, while preventing the pigments from dripping and which, moreover, is very reliable and safe in operation.

Another object of the present invention is to provide such a pigment metering apparatus which can be easily made starting from easily available elements and materials and which, moreover, is very competitive from an economic standpoint.

According to one aspect of the present invention, the above mentioned aim and objects, as well as yet other objects, which will become more apparent hereinafter, are achieved by an apparatus for metering pigments for paints and the like, comprising a bearing framework thereon support a rotary carousel, which supports in turn a plurality of pigment vessels, provided with a delivery assembly, characterized in that said delivery assembly comprises a valve element including a closure stem which can be arranged in a closing position, in which the pigment can not be delivered, and an opening position, in which the pigment can be delivered, and a draining position, in which said stem partially projects from a delivery nozzle.

BRIEF DESCRIPTION OF THE DRAWINGS

Further characteristics and advantages of the invention will become more apparent hereinafter from the following detailed disclosure of a preferred, though not exclusive, embodiment of an apparatus for metering pigments for paints and the like, which is illustrated, by way of an indicative, but not limitative, example, in the figures of the accompanying drawings, where.

DESCRIPTION OF THE PREFERRED EMBODIMENT

With reference to the number references of the above mentioned figures, the apparatus, for metering pigments for paints and the like, according to the present invention, comprises a bearing framework, generally indicated at the reference number 1, which is provided with a carousel 2 which can turn step by step about a vertical axis, said carousel supporting a plurality of pigment vessels 3 each of which is provided with a delivery or metering assembly, generally indicated by 4, allowing a pigment to be properly delivered, in a set dose amount, at a pigment delivery station 10.

Figure 3:
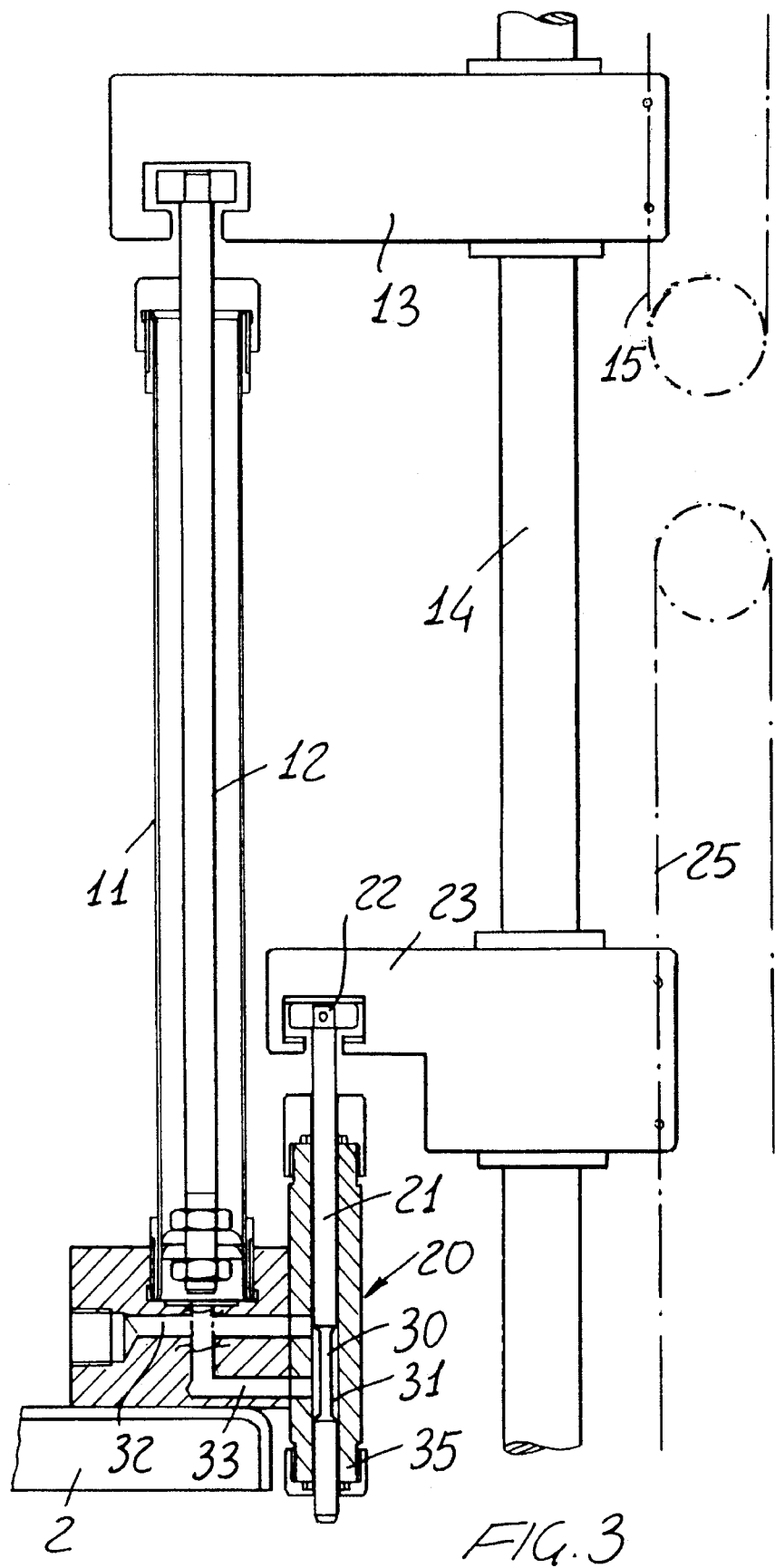
FIG. 3 illustrates the delivery assembly in a draining position thereof.
Figure 4:
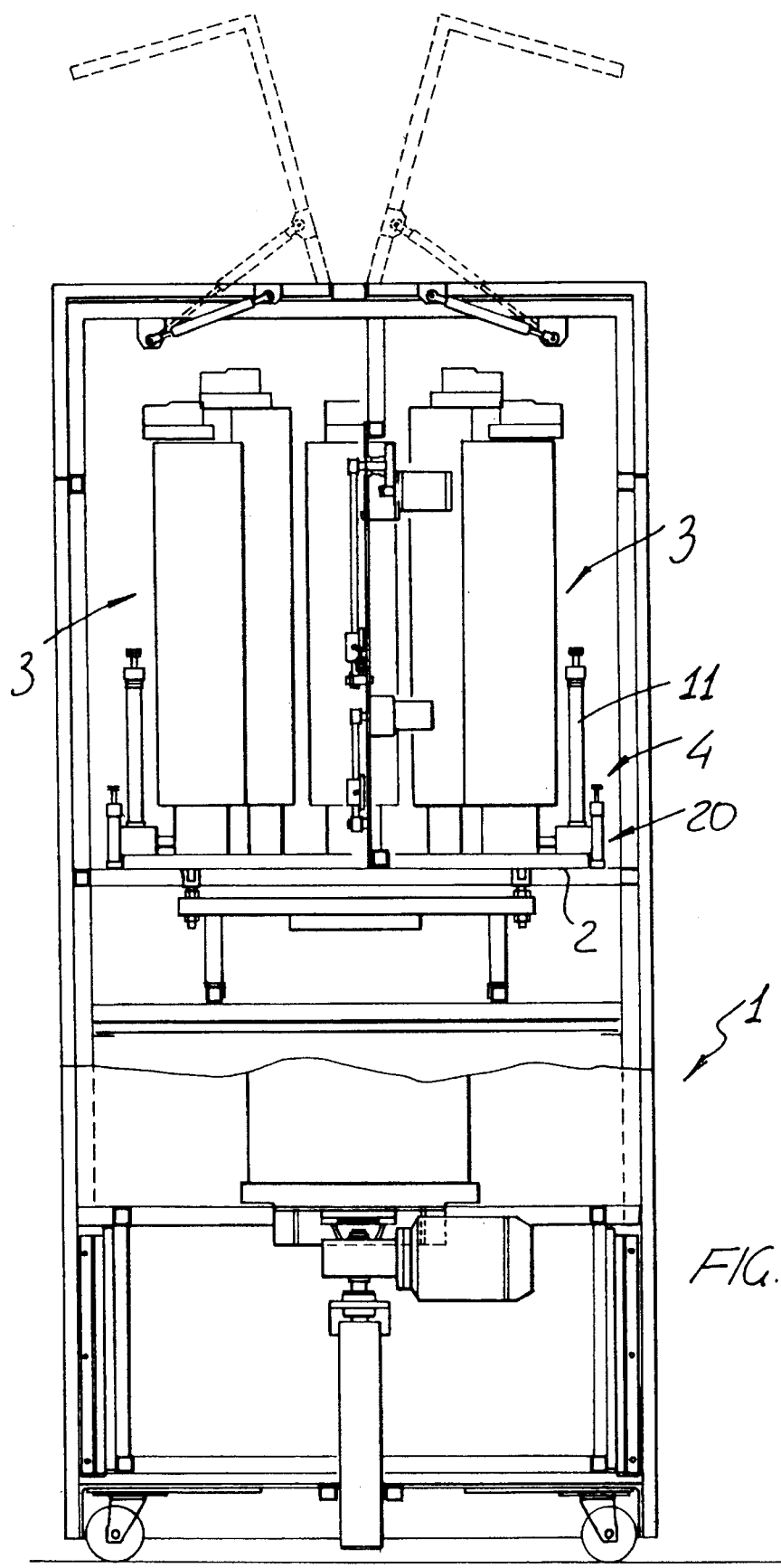
FIG. 4 is a side elevation view of the subject apparatus.
Figure 5:
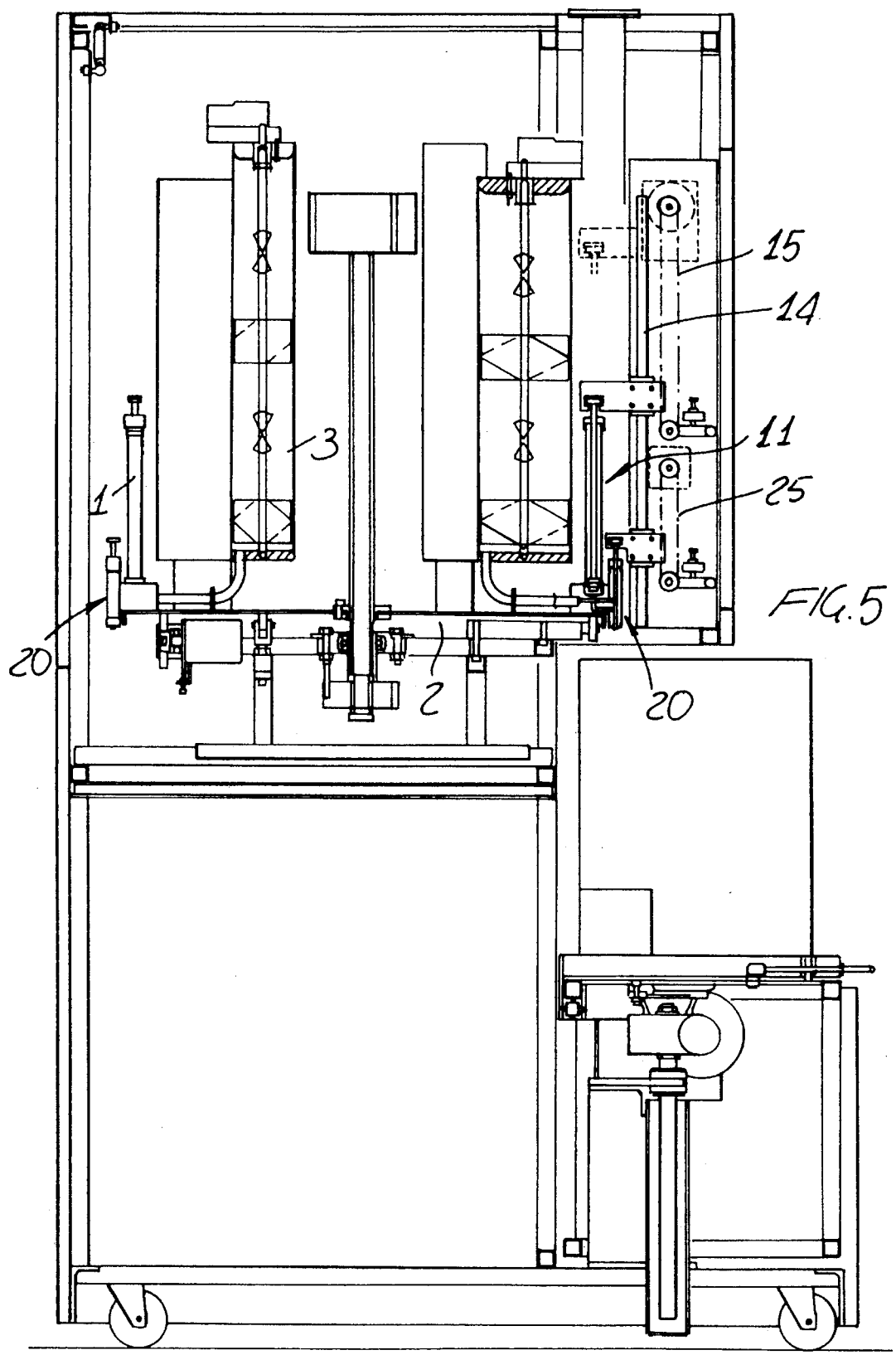
FIG. 5 is a partial cross-sectional view illustrating several delivery assemblies included in the subject apparatus.
Figure 6:
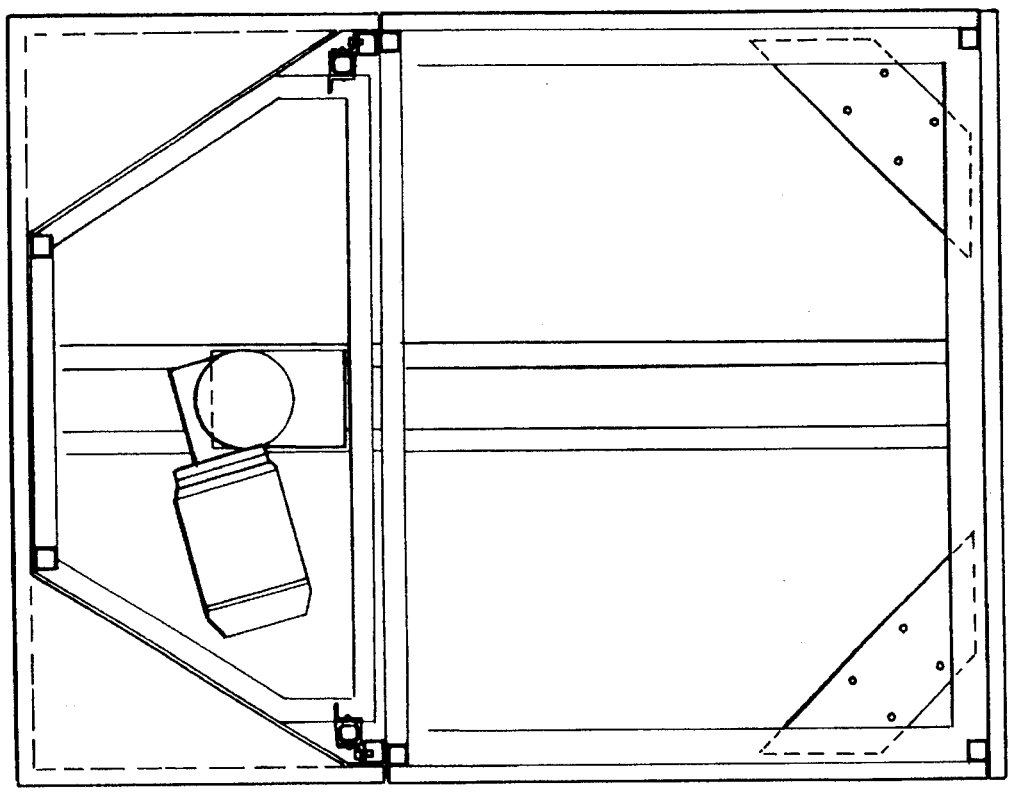
FIG. 6 is a top plan view of the subject apparatus.
Figure 7:
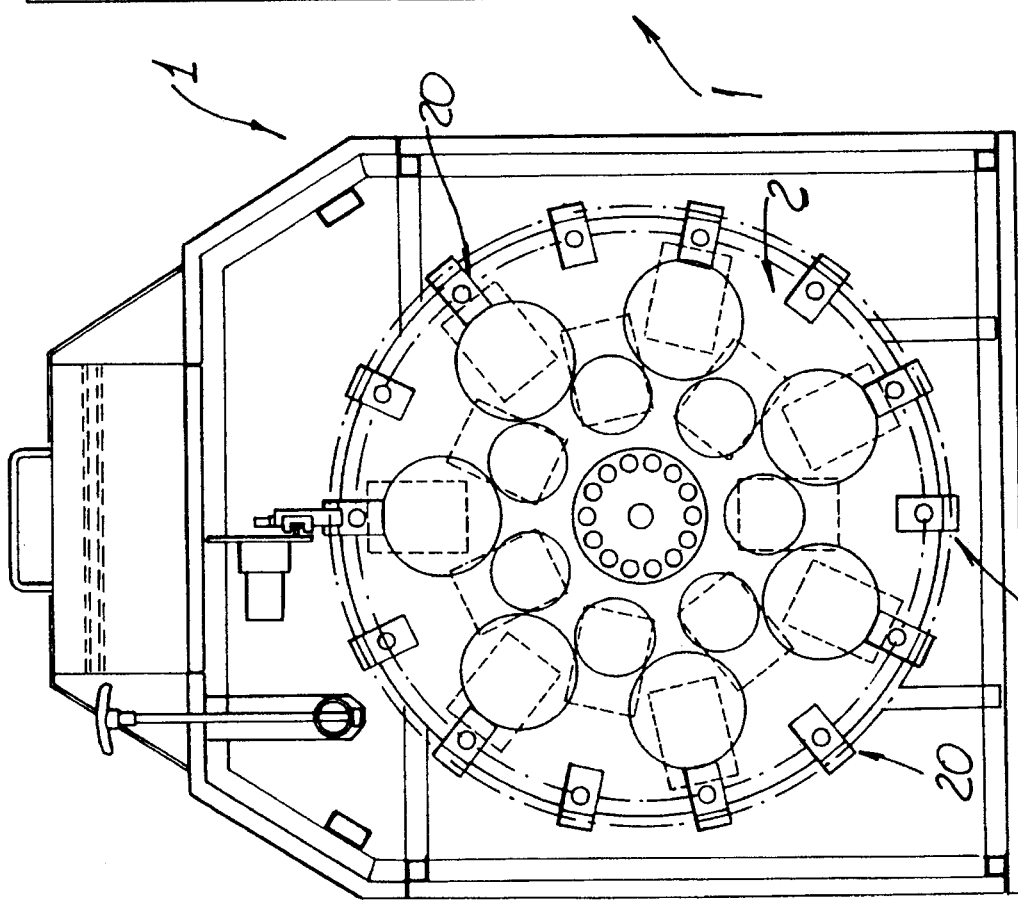
FIG. 7 is a bottom view of the apparatus, which clearly illustrates the arrangement of the pigment vessels.

Each pigment delivery assembly, as is clearly shown in FIG. 3, comprises a suction piston, indicated at 11, the piston rod 12 of which is connected at the top thereof to a driving block 13, which is slidably guided by an upright 14 and is connected to a ball circulation assembly 15, allowing the block to be precisely displaced, together with the piston rod 12 of the piston 11.

Near said piston 11 there is provided a valve element, generally indicated at the reference number 20, which is provided with a stem 21 including a head 22 connected to a movable block 23, which can also slide on the upright 14 and is connected to a second ball circulation assembly 25, provided for driving said block 23.

The stem 21 is provided, at a middle portion thereof, with a narrowed or neck portion 30 providing, inside the chamber 31 in which the stem 21 can slide, a duct adapted to communicate the vessel 3 connecting duct 32 with the piston 11 connecting duct 33.

Figures 1, 2:
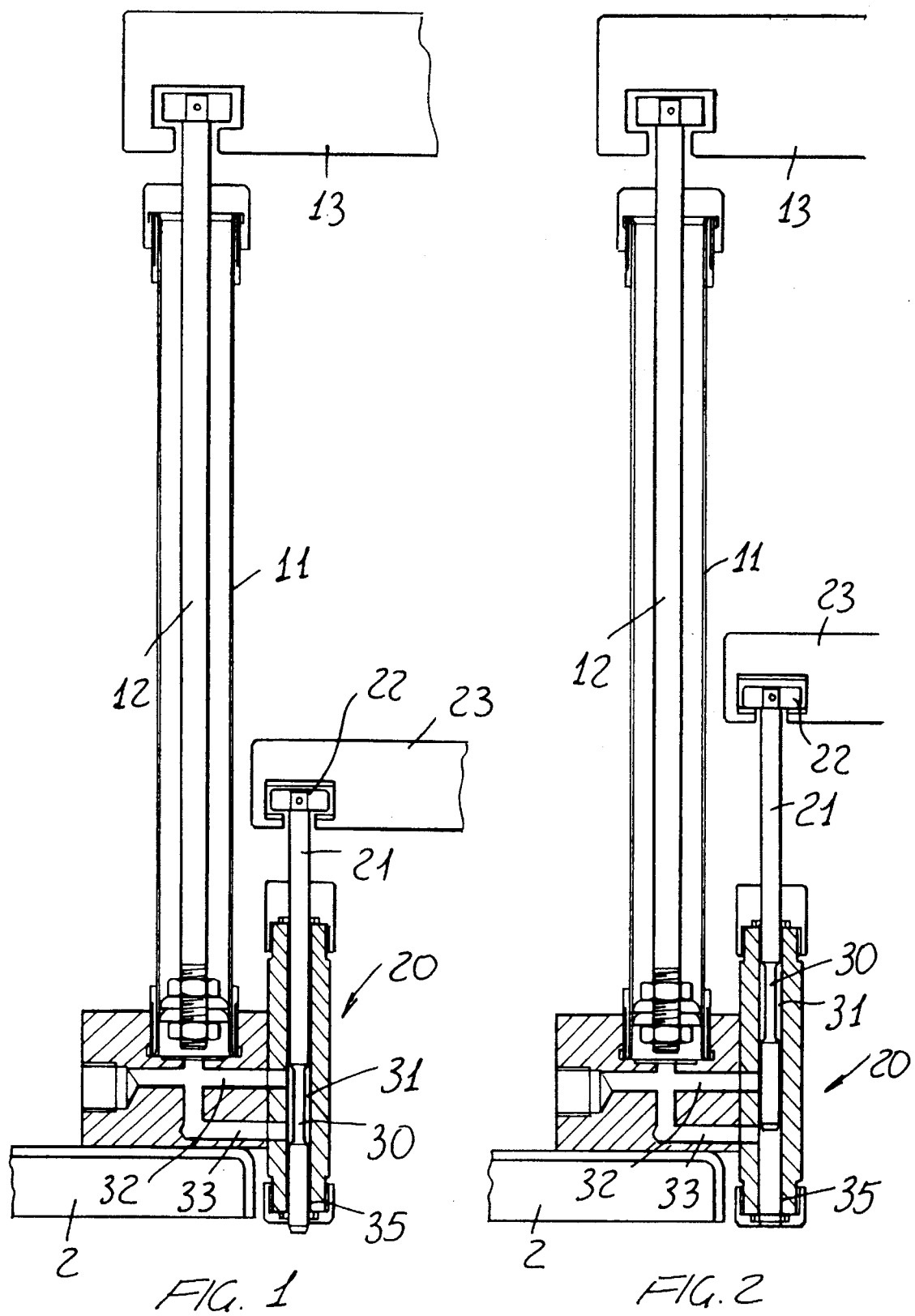
FIG. 1 is a schematic view illustrating the delivery or metering assembly in a closure position thereof.
FIG. 2 illustrates the delivery assembly in an opening position thereof.

More specifically, the stem 21 can be displaced to a closure or closing position, shown in FIG. 1, in which the stem will close the outside communicating nozzle 35, whilst the neck portion 30 will cause the ducts 32 and 33 to communicate with one another, so as to allow the piston 11 to withdraw the pigment.

In an opening position, the stem 21 is caused to raise, so that its free end portions will uncover the port of the piston 11 communicating duct 33, so as to allow the piston to eject the pigment.

At the end of the pigment delivery step, the stem 21 is brought to a residue pigment removal position, i.e. it is downwardly driven, so as to shut-off the communication with the outside and at least partially project from the nozzle 35, so that said stem will remove possible pigment residues thereby preventing deposits from forming and allowing a very accurate metered delivery of the pigment under all conditions.

From the above disclosure it should be apparent that the invention fully achieves the intended aim and objects.

In particular, the fact is to be pointed out that an apparatus has been provided in which the valve element 20, being provided with three positions, will allow to perform a full draining of the delivery port or nozzle, thereby preventing possible deposits from forming.

Moreover, the disclosed ball circulation construction for operating both the piston and the valve element will provide a very accurate and precise operation.

The invention, as disclosed, is susceptible to several variations and modifications, all of which will come within the scope of the inventive idea.

Moreover, all of the details can be replaced by other technically equivalent elements.

In practicing the invention, the used materials, provided that they are compatible to the intended use, as well as the contingent size and shapes, can be any, depending on requirements.

I claim:

1. An apparatus for metering pigments for paints comprising a bearing framework supporting a rotary carousel supporting in turn a plurality of pigment vessels each provided with a pigment delivery vessel, wherein each said pigment delivery assembly comprises a pigment delivery nozzle and a suction piston having a piston rod connected at a top portion thereof to a driving block slidably supported by an upright and connected to a first ball circulation assembly allowing said driving block and said piston rod to be precisely displaced; near said suction piston, valve means being provided, said valve means including a valve means stem including a head connected to a movable block also slidably supported on said upright and being connected to a second ball circulation assembly driving said movable block, said valve means stem sliding within a chamber and being provided with a middle neck portion providing, in said chamber, first duct means communicating second duct means of a said pigment delivery vessel with third connecting duct means of said suction piston, said valve means stem being driven from a first pigment delivery nozzle closing operation position in which said stem will close said pigment delivery nozzle and said neck portion of said stem will cause said second duct means of said pigment delivery vessel to communicate with said third connecting duct means of said suction piston, to a second pigment delivery nozzle opening operating position so as to allow said suction piston to draw a pigment from said pigment delivery vessel, and then to a third residue pigment removing operating position in which said stem is caused to project from said pigment delivery nozzle.

* * * * *